(12) United States Patent
Wollmershauser et al.

(10) Patent No.: US 8,218,791 B2
(45) Date of Patent: Jul. 10, 2012

(54) VOLUME CONTROL FEATURE FOR USE WITH A MULTIMEDIA DEVICE

(75) Inventors: Steven M. Wollmershauser, San Antonio, TX (US); William Averill, San Antonio, TX (US); William O. Sprague, Jr., Wimberley, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 993 days.

(21) Appl. No.: 12/143,586

(22) Filed: Jun. 20, 2008

(65) Prior Publication Data

US 2009/0316934 A1    Dec. 24, 2009

(51) Int. Cl.
*H03G 3/00* (2006.01)

(52) U.S. Cl. ....... 381/109; 381/104; 381/105; 340/4.37; 340/4.4; 340/4.41; 340/4.42; 700/94; 715/716

(58) Field of Classification Search .................. 381/109, 381/104, 105; 330/278; 715/716; 340/4.37, 340/4.4, 4.41, 4.42; 700/94
See application file for complete search history.

(56) References Cited

U.S. PATENT DOCUMENTS

| 7,890,661 B2* | 2/2011 | Spurgat et al. ................ 709/248 |
| 2005/0069101 A1 | 3/2005 | Bear et al. |
| 2005/0180583 A1 | 8/2005 | Bayon |
| 2006/0098798 A1 | 5/2006 | Krasnansky |
| 2006/0146146 A1 | 7/2006 | Asada |
| 2006/0227251 A1 | 10/2006 | Dickervitz |
| 2007/0284401 A1 | 12/2007 | Hilliard |
| 2009/0245536 A1* | 10/2009 | Felix ............................ 381/104 |

* cited by examiner

*Primary Examiner* — Kimberly D Nguyen
*Assistant Examiner* — Mohammad T Karimy
(74) *Attorney, Agent, or Firm* — Jackson Walker L.L.P.

(57) ABSTRACT

A disclosed set top box or other type of multimedia handling device (MHD) is configured to support a toggle volume feature that enables the end user to toggle between two or more substantially different audible volume settings using a single push of a single remote control button or other type of control, e.g., a touch screen control. In some embodiments, the MHD includes a processor, storage media accessible to and readable by the processor, a remote control interface in communication with the processor, a multimedia decoder, and an audio digital-to-analog converter. The remote control interface receives input from a remote control device. The multimedia decoder module receives and processes multimedia streams. The decoder generates a decoder audio output and a decoder video output. The DAC processes the decoder audio output and produces an audio signal having a particular volume level.

9 Claims, 6 Drawing Sheets

VOLUME CONTROL FEATURE FOR USE WITH A MULTIMEDIA DEVICE

BACKGROUND

1. Field of the Disclosure

The disclosed subject matter is in the field of multimedia content and, more specifically, networks and devices for distributing and displaying multimedia content.

2. Description of the Related Art

In the field of multimedia content distribution, content typically includes audio content as well as video content. A characteristic of audio content is the volume of the content when played on a suitable device such as a speaker. The optimal volume for audio content is subjective, with some individuals preferring higher volume than others. Moreover, an individual may prefer different volumes for different types of content.

DESCRIPTION OF THE EMBODIMENT(S)

In one aspect, a disclosed set top box or other type multimedia handling device (MHD) is configured to support a toggle volume feature that enables the end user to toggle between two or more substantially different audible volume settings using a single push of a single button or other type of control, e.g., a touch screen control, of a remote control device. In some embodiments, the MHD includes a processor, storage media accessible to and readable by the processor, a remote control interface in communication with the processor, a multimedia decoder module (decoder), and an audio digital-to-analog converter (DAC). The remote control interface receives input from a remote control device. The multimedia decoder module receives and processes multimedia streams. The decoder generates a decoder audio output and a decoder video output. The DAC processes the decoder audio output and produces an audio signal having a particular volume level.

Computer code or computer software in the form of processor executable instructions embedded in the storage media, includes a toggle volume application. The toggle volume module application includes instructions to store information indicative of a first volume level, sometimes referred to herein as a "program volume" level and information indicative of a second volume level, sometimes referred to herein as a "commercial volume" level. In this context, "program" is used in the sense of the content that a user wants to view and "commercial" refers to advertisements. The program volume level and the commercial volume level are both audible levels. The program volume level is greater than the commercial volume level by two or more incremental volume intervals where an incremental volume interval represents a difference in volume levels between adjacent volume settings.

When the current volume level of the audio signal is the program volume level, the toggle volume application responds to a toggle volume signal from the remote control by setting the volume level of the audio signal to the commercial volume level. When the current volume level is the commercial volume level, the toggle volume application responds to detecting the toggle volume signal from the remote control by setting the volume level to the program volume level.

In some embodiments, the toggle volume application responds to detecting a mute signal from the remote control by toggling an audio enable signal. The mute signal and the toggle volume signal may be invoked using a single button or other type of control mechanism of the remote control device to reduce the number of buttons required to implement the toggle volume feature. The toggle volume signal might be sent, for example, by pressing a button on the remote control for a short duration while the mute signal might be sent by pressing the button twice in rapid succession or by another suitable means of pressing the button.

In some embodiments, the commercial volume level and the program volume level are user programmable. Programming the commercial and program volume levels may be controlled using the same button used for the mute and volume toggle functions. For example, setting the commercial or program volume levels may be achieved by pressing the button for an extended duration.

In some embodiments, the commercial volume level is N incremental volume levels less than the program volume level wherein N is an integer greater than 1. In some embodiments, N is in the range of approximately 3 to approximately 7. The toggle volume application may be further configured to respond to detecting a second toggle volume signal in close chronological proximity to the original toggle volume signal by toggling an audio enable signal.

In another aspect, a toggle volume service for use in conjunction with a multimedia content distribution service is disclosed. The toggle volume service includes enabling a set top box or other form of MHD to respond to a toggle volume signal from a remote control device by toggling a volume setting between a program volume level and a commercial volume level where the commercial volume level and the program volume level are both audible levels. The commercial volume level is less than the program volume level by an amount approximately equal to N times an incremental volume where N is greater than 1 and the incremental volume level represents a difference in volume level between two adjacent volume settings of the set top box.

The toggle volume service of claim 7 may also enable the set top box to respond to a second toggle volume signal in close chronological proximity to a first toggle volume signal by muting the volume when the volume is not currently muted and by un-muting the volume when the volume is currently muted. In addition, the toggle volume service may include enabling the set top box to store user programmable values representing the commercial volume level and the program volume level. The service may support storing the commercial and program volume levels in response to a "set volume" signal from the remote control device. The set volume signal may be transmitted using the same remote control button used to generate the toggle volume signal and the mute volume signal.

In another aspect, a disclosed remote control device is suitable for use in operating an MHD. The remote control device may include a toggle volume button that, when asserted, generates a toggle volume signal. The toggle volume signal, when detected by the MHD, causes a volume setting associated with the MHD to toggle between a first audible volume level and a second audible volume level. The toggle volume button is further operable, when asserted in a second manner, to generate a mute signal, wherein the mute signal, when detected by the MHD, mutes or un-mutes the sound associated with the MHD. Asserting the toggle volume button in the second manner may include asserting the button two or more times in close chronological succession or asserting the button for an extended duration.

The toggle volume button may also cause the remote control device to generate a set-program-volume level signal. The set-program-volume level signal, when detected by the MHD, sets the current volume level as either the program volume level or commercial volume level.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
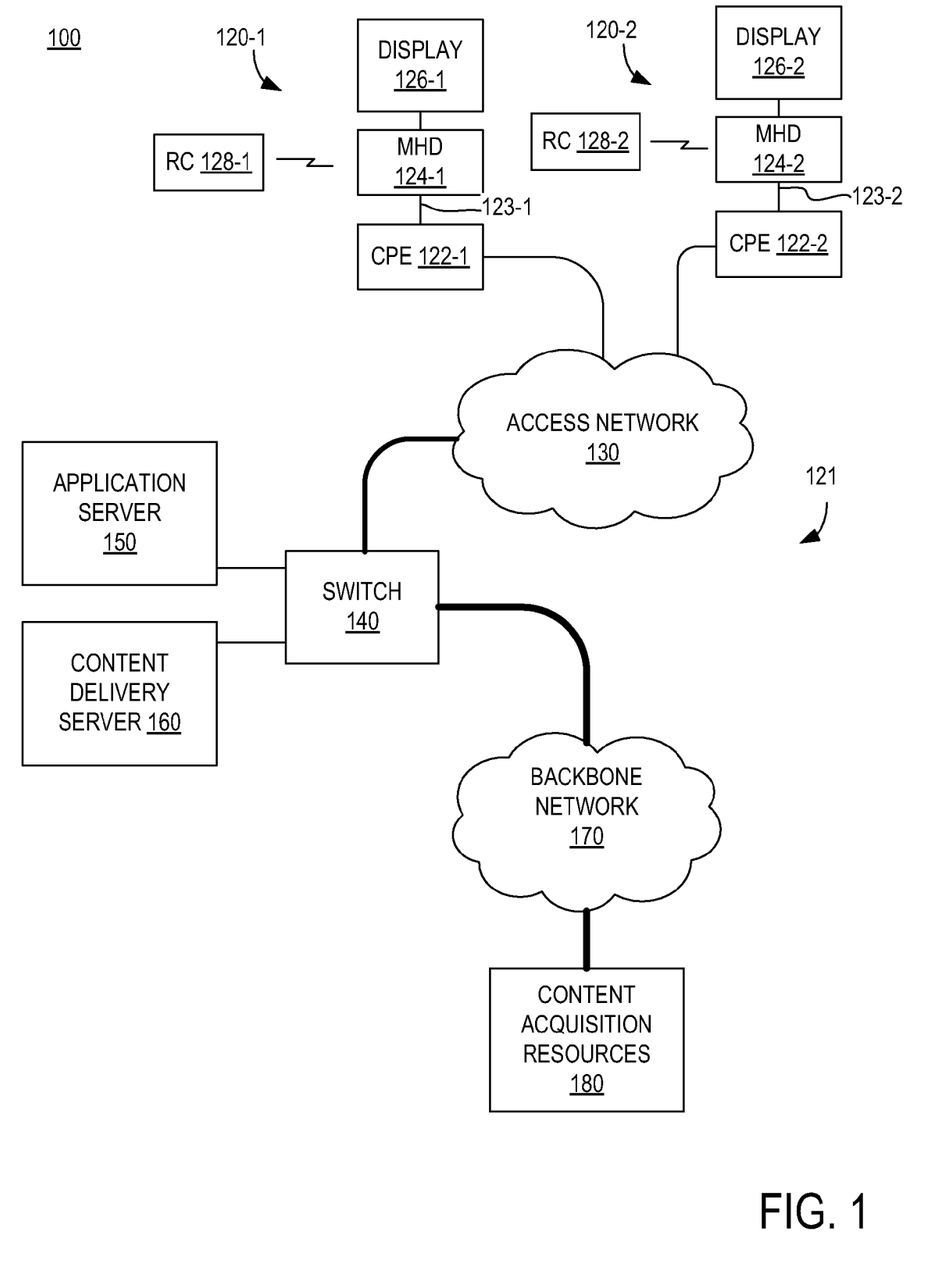
FIG. 1 is a block diagram of selected elements of an embodiment of a multimedia content distribution network.

Turning now to the drawings, FIG. 1 is a block diagram illustrating selected elements of an embodiment of a multimedia content delivery (MCD) network 100. The depicted embodiment of MCD network 100 includes or supports functionality enabling an administrative user such as a parent to control or otherwise manage another user's access to multimedia content. Although multimedia content is not limited to television (TV), video on demand (VOD), or pay-per-view programs, the depicted embodiments of MCD network 100 and its capabilities are described herein with primary reference to these types of multimedia content, which are interchangeably referred to herein as multimedia content program (s), multimedia programs or, simply, programs.

The elements of MCD network 100 illustrated in FIG. 1 emphasize the network's functionality for delivering multimedia content to a set of one or more subscribers. As depicted in FIG. 1, MCD network 100 includes one or more clients 120, where each client 120 may represent a different subscriber, and a service provider 121 that encompasses resources to acquire, process, and deliver multimedia content to clients 120. Clients 120 and service provider 121 are demarcated in FIG. 1 by an access network 130 to which clients 120 and service provider 121 are connected. In some embodiments, access network 130 is an Internet protocol (IP) network, while in others, access network 130 may be implemented with alternative network technology. In IP implementations of access network 130, access network 130 may employ a physical layer of unshielded twist pair cables, fiber optic cables, or both. MCD network 100 may employ digital subscribe line (DSL) compliant twisted pair connections between clients 120 and a node (not depicted) in access network 130 while fiber cable or another broadband medium connects service provider resources to a node in access network 130. In other embodiments, the broadband cable may extend all the way to clients 120.

The clients 120 depicted in FIG. 1 include a network appliance identified as customer premises equipment (CPE) 122 that connects to access network 130 and to an MHD 124. CPE 122 may supply routing, firewall, or other services for clients 120. CPE 122 may include elements of a broadband modem such as an asynchronous DSL (ASDL) modem as well as elements of a local area network (LAN) access point that supports a LAN 123 to which MHD 124 connects. LAN 123 may, in some embodiments, represent an Ethernet compliant LAN, also sometimes referred to as an IEEE 811 LAN. Clients 120 as depicted in FIG. 1 further include a display device or, more simply, a display 126. A remote control 128 of client 120 is operable to communicate requests or commands wirelessly to MHD 124 using infrared or radio frequency signals as is well known. MHDs 124 may also receive input via buttons or other types of control mechanisms (not depicted) located on side panels of MHDs 124.

Figure 2:
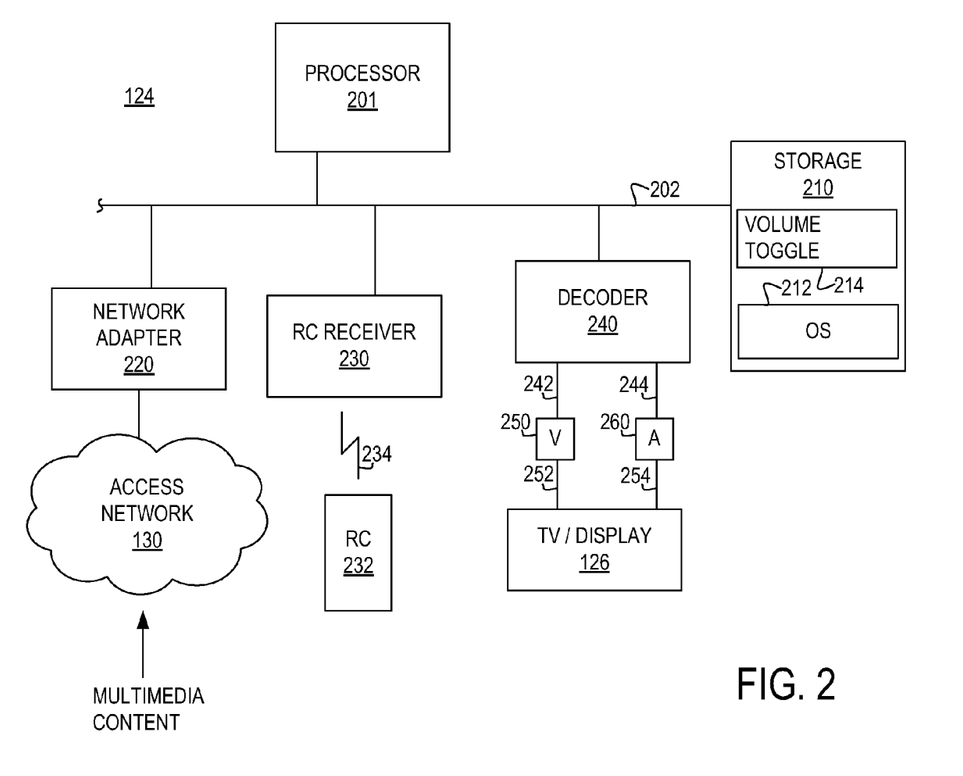
FIG. 2 is a block diagram of selected elements of a multimedia handling device suitable for use in a multimedia content distribution network.

MHD 124 may be implemented as a stand-alone set top box suitable for use in a co-axial or IP-based MCD network. In other embodiments, MHD 124 may be integrated with display 126, CPE 122, or both. Referring to FIG. 2, a block diagram illustrating selected elements of MHD 124 is presented. In the depicted embodiment, MHD 124 includes a processor 201 coupled, via a shared bus 202, to storage media collectively identified as storage 210. Storage 210 encompasses persistent and volatile media, fixed and removable media, and magnetic and semiconductor media. Storage 210 is operable to store data as well as sets of instructions, i.e., computer programs. Storage 210 as shown includes two computer programs, namely, an operating system 212 and an application program identified as volume toggle application 214. Operating system 212 may be a Unix or Unix-like operating system, a Windows® family operating system, or another suitable operating system.

MHD 124 as depicted in FIG. 2 further includes a network adapter 220, a remote control (RC) receiver 230, and a decoder 240. Network adapter 220 interfaces MHD 124 and processor 201 to an external network such as access network 130. In this embodiment, access network 130 may convey multimedia content from a provider to MHD 124. Although FIG. 2 depicts network adapter 220 of MHD 124 connected directly to access network 130, it will be appreciated that, as in FIG. 1, there may be intervening network appliances including CPE 122 between network adapter 220 and access network 130.

Decoder 240 includes resources to process multimedia content received from access network 130. In networks that deliver bundles of channels of content simultaneously, including conventional co-axial cable based access network systems, decoder 240 includes circuits or resources to demodulate a desired channel of content from incoming signal. If the multimedia content is transmitted to MHD 124 over a packet switched access network including access networks that employ IP, decoder 240 may assemble individual packets into a multimedia stream. The multimedia stream may then be de-multiplexed into audio and video signals that are decoded and, in some cases, descrambled or decrypted. The decoding algorithm or algorithms employed by decoder 240 is an implementation detail, but at least some embodiments of decoder 240 support MPEG-2 video and audio decoding.

In the depicted embodiment decoder 240 generates a decoded video signal 242 and a decoded audio signal 244. Decoded video signal is then processed by a video encoder 250 to produce a signal 252 compatible with an NTSC (National Television System Committee) or PAL (Phase Alternating Line) TV/display 126. The decoded audio signal 244 is processed by a DAC 260 to generate an audio signal 254 that is provided to TV/Display 126 or, in some cases, one or more external speakers (not depicted in FIG. 2).

MHD 124 as depicted also includes an RC receiver 230 adapted to receive an RC signal 234 from RC 232. In some implementations, RC 232 is an infrared (IR) remote control and RC signal 234 is an IR signal, in which cases RC receiver 230 is an IR receiver. In other embodiments, RC 232 may generate RF signals or signals compatible with a personal area network technology such as Bluetooth. Regardless of the particular technology employed, RC receiver 230 is configured to receive and interpret signals from RC 232 as RC 232 is operated by an end user. The signals transmitted by RC 232 are interpreted as requests or commands including requests to change channels, requests to change volume, and so forth. Some embodiments of RC 232 include or support functionality for providing a toggle volume service as described in the following paragraphs. The toggle volume functionality enables subscribers, viewers, or other end users to change volume levels between two or possibly more predetermined volume levels that are greater than 0, i.e., functionality to toggle system volume between or among two or more audible volume levels. Although the embodiments described herein are systems implemented with two audible volume levels, other implementations may employ more levels.

In some embodiments not depicted herein, the toggle volume feature may be supported with a button dedicated to the toggle volume feature. In the embodiments described herein, however, the RC 232 reduces the number of buttons or other types of controls required by sharing two or more features or functions with a single button of remote control 232. In some embodiments described herein, for example, the toggle volume feature may be enabled and controlled using a button that is also employed for achieving "mute" functionality. Although embodiments disclosed herein as having buttons includes embodiments in which the buttons are physical or mechanical buttons, the terms "button" and "buttons" as used herein encompass other types of controls including, for example, touch screen controls and other types of virtual buttons or virtual controls.

Figure 3:
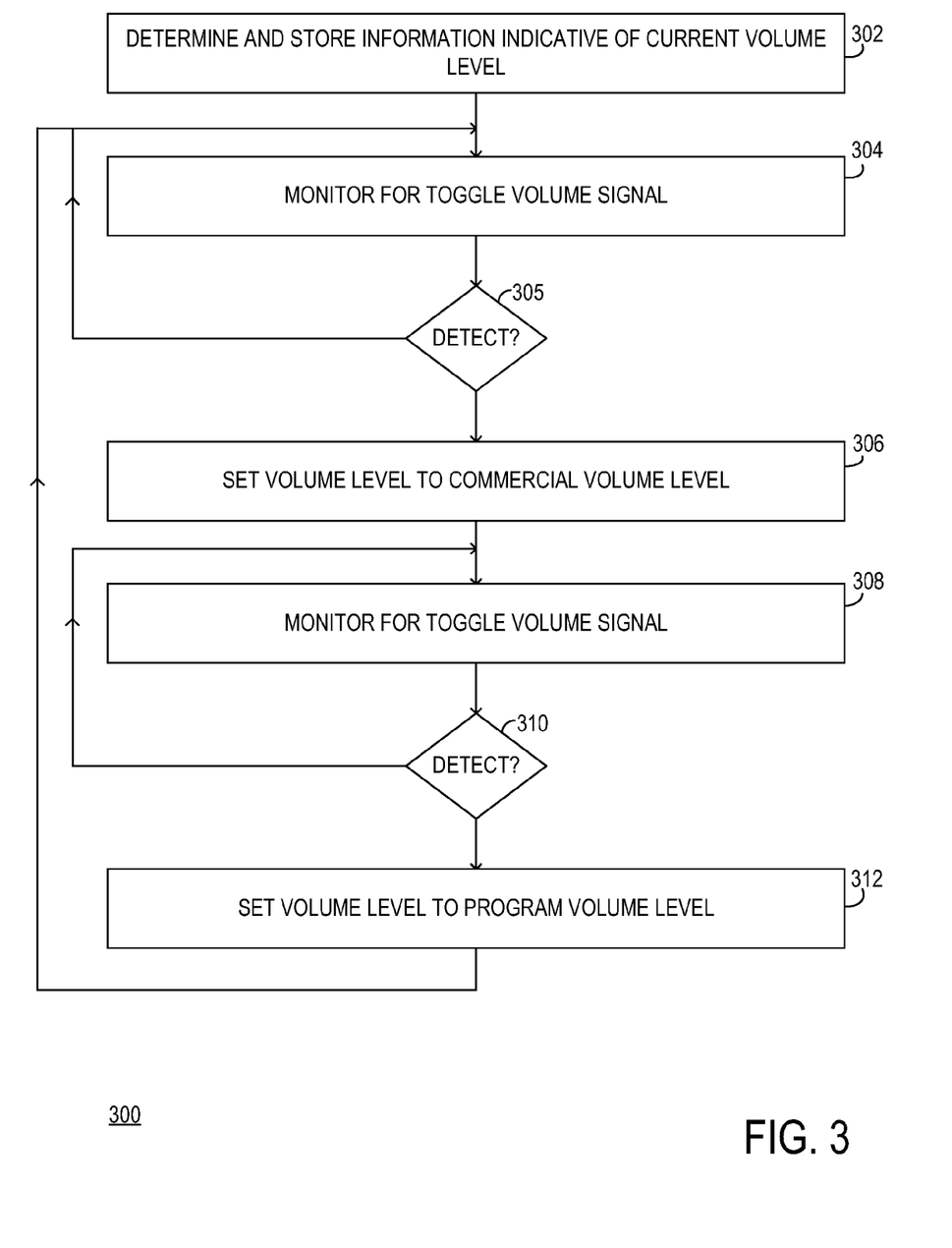
FIG. 3 is a flow diagram of selected elements of an embodiment of a volume toggle method.

Before describing details of particular implementations, however, referring to FIG. 3, the flow diagram depicts selected elements of an embodiment of a method 300 for toggling volume. In the depicted embodiment, method 300 includes an initial block 302 in which information that indicates the current volume level is determined and stored in storage 210 or in other computer readable media. After determining the current volume level in block 302, the depicted embodiment of method includes monitoring (block 304) for a toggle volume signal from RC 232 or from a toggle volume button on a front panel (not depicted) of MHD 124.

If, at block 305, a toggle volume signal is detected, the depicted method sets (block 306) the volume level to a lower, but still audible volume level, referred to herein as the "commercial" volume level to emphasize a particularly beneficial use of the toggle volume signal in rapidly reducing the sound to a lower volume level when a commercial break is encountered. The ability to reduce the volume to a predetermined level that is, presumably, a lower volume level than could be achieved with a single click of a reduce volume button beneficially enables end users to change volumes rapidly while still being able to hear some audio content.

After the commercial volume level is set in block 306, the depicted embodiment of method 300 then monitors (block 308) for the same toggle volume signal. If a toggle volume signal is then detected in block 310, the volume level is restored to the "program" volume level in block 312. After the program volume level is set in block 312, flow then returns to block 304 where the system monitors for a toggle volume signal.

Figure 4:
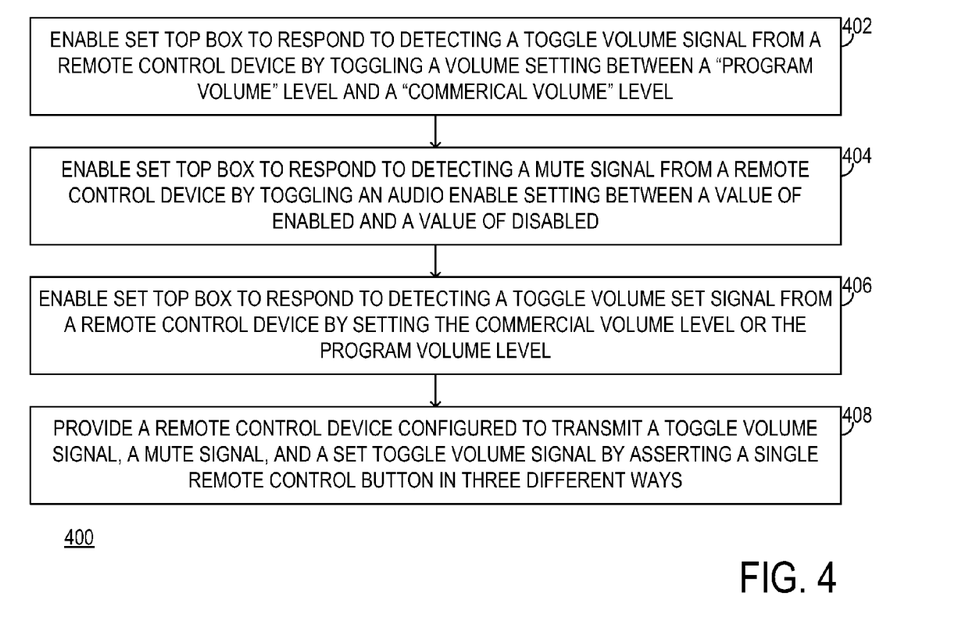
FIG. 4 is a flow diagram of an embodiment of selected elements of a volume toggle service.

In some embodiments, the toggle volume functionality is implemented as a service offered to a subscriber by an MCD provider. Referring to FIG. 4, a flow diagram depicts selected elements of an embodiment of a toggle volume service 400. Toggle volume service 400 may be provided or supported by the MCD provider on a subscription basis, with or without a one-time or recurring fee. The service might be offered, for example, by providing the subscriber with an enhanced remote control device that is configured to generate the toggle volume functionality and the subscriber might be assessed a recurring fee for use of the enhanced remote control device.

Referring to FIG. 4, the depicted embodiment of volume toggle service 400 includes enabling (block 402) a set top box or other type of MHD to respond to detecting a toggle volume signal from a remote control device by toggling a volume setting of the set top box between a "program volume" level and a "commercial volume" level. The service 400 may also include enabling (block 404) the set top box to respond to detecting a mute signal from a remote control device by toggling an audio enable setting of the set top box between a value of "enabled" and a value of "disabled." Service 400 may also include enabling (block 406) the set top box to respond to detecting a toggle volume set signal from the remote control device by setting the current volume or a selectable volume level as either the commercial volume level or the program volume level. In the embodiment depicted in FIG. 4, toggle volume service 400 may further include the optional step of providing (block 408) a remote control device that supports the toggle volume feature or features. The remote control device that is provided to support the toggle volume feature may be configured to transmit a toggle volume signal by asserting a toggle volume button in a first manner, transmit a mute signal by asserting the toggle volume button in a second manner, and transmit a set toggle volume signal by asserting the toggle volume button in a third manner.

Enabling the set top box or other MHD to support the toggle volume feature may include the MCD provider downloading software and/or firmware to a subscriber's existing MHD 124. In other embodiments, the volume toggle service may be supported by providing the subscriber with a new or different MHD 124. Moreover, although the embodiment of toggle volume service 400 as described herein employs a single remote control button to support different features of the toggle volume service, other embodiments may dedicate two or more buttons to the toggle volume application.

Figure 5:
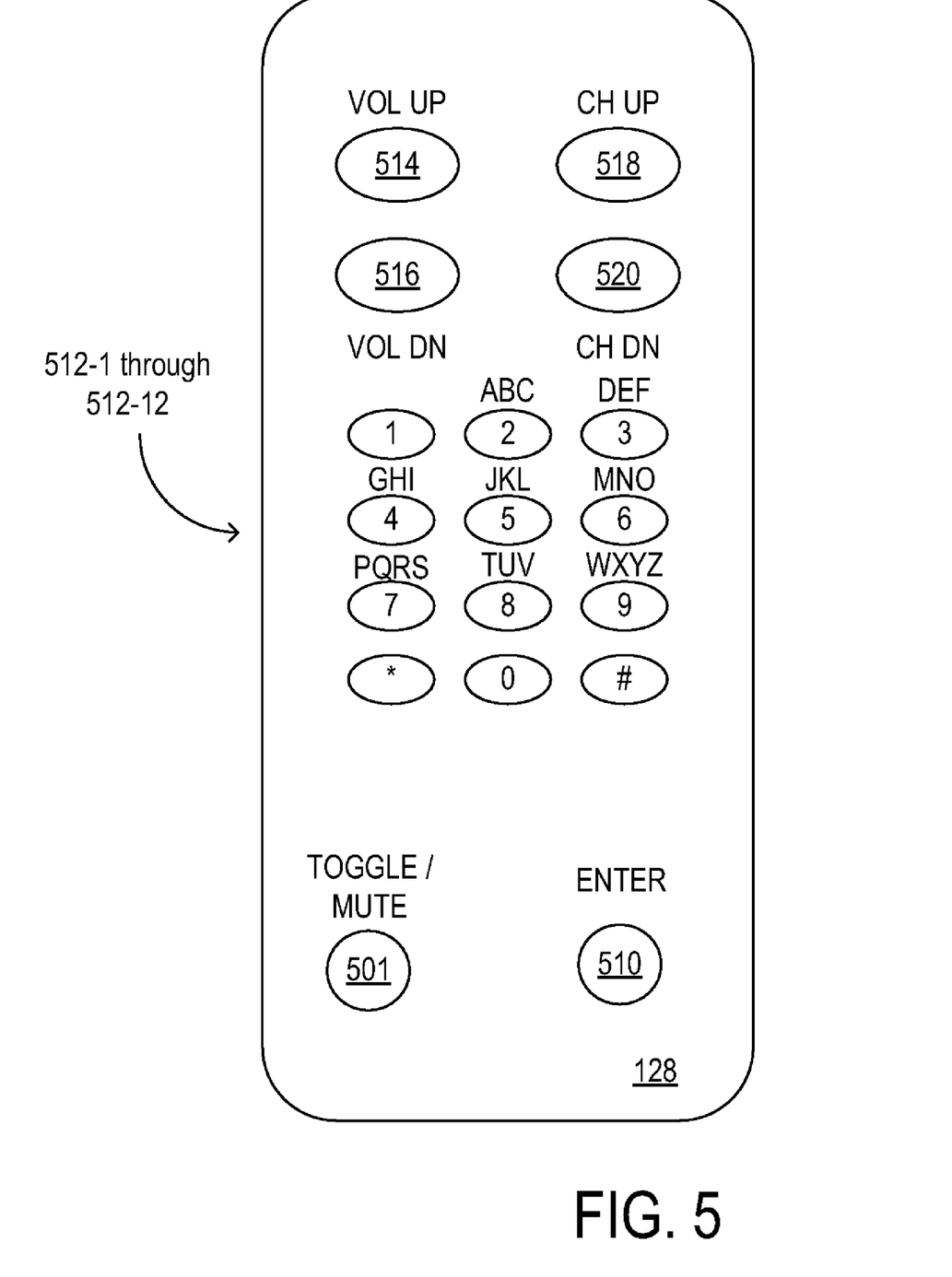
FIG. 5 depicts selected elements of an embodiment of a remote control device suitable for use with a volume toggle feature.

Referring now to FIG. 5, selected elements of an exemplary remote control device 128 suitable for supporting a volume toggle feature as disclosed herein are depicted. Remote control device 128 may communicate with a set top box or other MHD 124 using any of various suitable technologies or protocols including as examples, IR technology, RF technology, or a personal area network technology such as Bluetooth. In the depicted embodiment, remote control device 128 includes a set of twelve numeric keypad buttons 512-1 through 512-12 for transmitting alphanumeric signals, an "enter" button 510 for initiating or acknowledging certain requests or commands, volume up and down buttons 514 and 516 for manually adjusting a volume setting, and channel up and down buttons 518 and 520, for adjusting the channel up or down. In the depicted embodiment, the volume toggle feature is supported using a single remote control button labeled in FIG. 5 as toggle/mute button 501.

In this embodiment, button 501, depending upon how it is asserted, may transmit different types of signals. In one embodiment, for example, a single, short assertion of button 501 may generate a toggle volume signal, multiple assertions of button 501 in close chronological proximity to one another may generated a mute signal, and a single relatively long assertion of button 501 may generate a set toggle volume signal. The toggle volume signal may cause MHD 124 to toggle its volume setting between a program volume level and a commercial volume level. The mute signal may cause remote control device 128 to transmit an audio enable/disable signal to MHD 124. The enable/disable signal may toggle an audio enable setting of MHD 124. The toggle volume set signal may cause MHD 124 to set the value of the commercial volume level and/or the program volume level.

The toggle/mute button 501 may support other features and/or generate other signals as well. Moreover, the button may support the described features in a manner that varies from the manner described herein. For example, the toggle/mute button 501 may operate by cycling MHD 124 through a sequence of three states, a program volume state, a commercial volume state, and a mute state. In this embodiment, the end user would change the volume level from program volume to commercial volume by pressing button 501 once, change the volume level from commercial volume to mute by pressing button 501 again, and change the volume level from mute to program volume level by pressing button 501 a third time. Other implementations of the manner in which button 501, possibly in conjunction with other buttons, is configured to support the toggle volume feature are possible.

Figure 6:
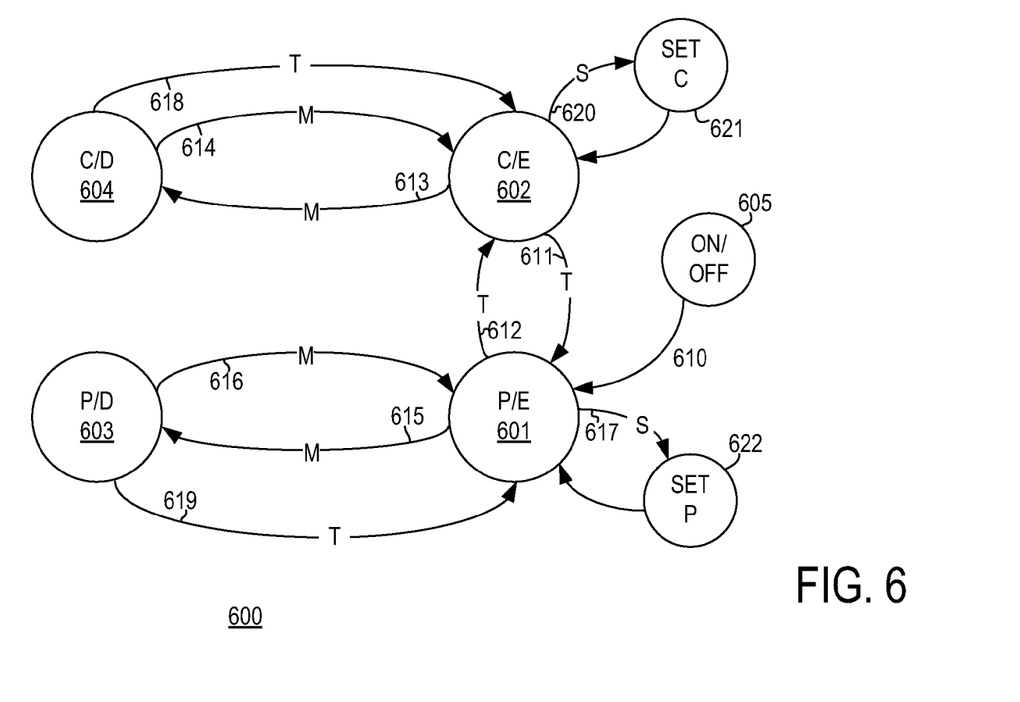
FIG. 6 is a state diagram emphasizing functionality associated with an embodiment of a volume toggle feature that may be implemented with a multimedia handling device.

Referring now to FIG. 6, a state diagram 600 illustrates the functioning of an exemplary embodiment of a toggle volume feature. In the depicted implementation, the toggle volume feature is invoked and controlled using a single remote control button that is integrated with the mute button. In addition, the same remote control button supports user settings of the commercial and program volume levels that are used in the toggle volume feature.

Diagram 600 illustrates four main volume states of MHD 124, namely, a program/enabled (P/E) state 601, a commercial/enabled (C/E) state 602, a program/disabled (P/D) state 603, and a commercial/disabled (C/D) state 604. The four states encompass two variables, namely, a program/commercial variable and an enable/disable variable. The program/commercial variable determines whether the volume level is set to the program volume level or the commercial volume level as described herein. The enable/disable variable determines whether the sound is enabled or disabled, i.e., muted. In some embodiments, the two variables are controlled using a single remote control button.

In the depicted embodiment, following a power-on transition 605 of MHD 124, MHD 124 enters the P/E state 601 in which the sound is enabled and the current volume level is saved as the program volume level. In some embodiments, the program volume level may be stored between power transitions and recalled as the initial program volume level following power on. In other embodiments, the last volume setting that was current before the power off occurred is stored and recalled as the initial value of the program volume level.

As depicted in FIG. 6, the end user may transition the state of MHD 124 from P/E 601 to C/E 602 by causing the remote control device to transmit a toggle (T) signal 612. In some embodiments, the T signal 612 is transmitted by pressing a toggle volume button a single time for a relatively short duration. When the MHD 124 detects the T signal 612 and the MHD 124 transitions to the C/E state 602 for the first time following a power on transition, MHD 124 will recall a commercial volume setting from a previous power tenure or determine a commercial volume setting algorithmically based on the current value of the program volume level.

In some embodiments, for example, the initial value of the commercial volume level may default to a volume level that is a specified interval below the program volume level. The intervals may be specified in terms of decibels, audio signal amplitude, audio signal power, or in any other suitable manner. In some embodiments, MHD 124 employs a set of finite, discrete power level settings where adjacent volume settings are accessed using the volume up/down button(s) of the remote control device. In these embodiments, the difference in volume setting between adjacent settings of MHD 124 may be referred to as the incremental volume level.

In some embodiments, the difference between the program and commercial volume levels is greater than the incremental volume setting. The difference between the program and commercial volume setting may be, for example, between 3 and 7 times the incremental volume setting. In these embodiments, pressing the volume toggle button one time when the MHD 124 is in the P/E state 601 causes the MHD 124 to enter the C/E state 602 by reducing the volume setting of MHD 124 by a value of between 3 and 7.

The user may then transition MHD 124 back from C/E state 602 to P/E state 601 by again asserting the toggle volume button to generate T signal 611. MHD 124 may then transition from P/E state 601 to P/D state 603 in response to a user transmitting a mute (M) signal 615. Transmitting M signal 615 may entail the user asserting the toggle volume button two or more times in rapid succession, e.g., two or more times within a one second interval beginning when the first assertion occurs. The M signal 615, in some embodiments, causes the MHD 124 to disable (mute) the audio output or sound. The user may restore sound and transition MHD 124 from P/D state 603 back to P/E state 601 by transmitting an M signal 616.

FIG. 6 also depicts MHD 124 responding to a third signal, the volume set (S) signal 617 by setting the program volume level (P) in block 622. Transmitting the S signal 617 may include the user asserting the toggle volume button in a third manner, such as by asserting the toggle volume button for an extended duration, e.g., greater than 2 seconds. Transmitting the S signal 617 may cause MHD 124 to set the current volume level as the program volume level. In this embodiment, the user may adjust the volume manually using the up/down volume buttons, and set the program volume level at the desired volume level by transmitting the S signal 617. After the program volume level is set in block 622, the MHD 124 returns to the P/E state 601 automatically. In some embodiments, transmitting the S signal 617 may invoke an interface or other form of prompt that enables the user to select the program volume level interactively using the up/down volume buttons or the alphanumeric keys.

When MHD 124 is in C/E state 602, the user has the same three options available. The user may toggle the volume by transmitting T signal 611 to transition MHD 124 to P/E 601, transmit M signal 613 to transition MHD 124 to C/D state 604, in which the sound is muted, and transmit an S signal 620 to set the commercial volume setting (C) in block 621. When MHD 124 is in either of the muted states, P/D state 603 or C/D state 604, the user transitions MHD 124 back to the applicable enabled state by transmitting M signal 614 or 616 as applicable. If a user transmits a T signal while in disabled state 603 or 604, some embodiments may perform no action, while other embodiments may perform an action such as returning to the applicable enabled or un-muted state such as shown by T signals 618 and 619. Similarly, assertion of an S signal while in a disabled state may be handled differently depending upon the implementation. In the depicted embodiment, the disabled states 603 and 604 do not recognize an S signal and, therefore, the S signal does not cause a state transition.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A multimedia handling device, comprising:
a processor;
storage media accessible to the processor;
a remote control interface in communication with the processor and configured to receive input from a remote control;
a multimedia decoder configured to receive a multimedia stream and generate a decoder audio output and a decoder video output; and
an audio digital-to-analog converter configured to process the decoder audio output to produce an audio signal having an audio signal volume level;
wherein program instructions, executable by the processor, stored in the storage media include volume toggling instructions, wherein the volume toggling instructions include instructions to:
store information indicative of a commercial volume level and information indicative of a program volume level;
respond to detecting an isolated toggle volume signal from the remote control when a current volume level is the program volume level by setting the audio signal volume level to the commercial volume level; and
respond to detecting an isolated toggle volume signal from the remote control when the current volume level is the commercial volume level by setting the audio signal volume level to the program volume level;
wherein the program volume level and the commercial volume level are both audible volume levels and wherein the volume toggling instructions respond to detecting two toggle volume signals in close chronological proximity to each other by toggling an audio enable signal.

2. The device of claim 1, wherein the volume toggling instructions include instructions to respond to detecting a mute signal from the remote control by toggling the audio enable signal.

3. The device of claim 2, wherein the commercial volume level and the program volume level are user programmable.

4. The device of claim 1, wherein the volume toggling instructions include instructions to respond to detecting a volume up signal by increasing the current volume level by a predetermined incremental volume level and further wherein a difference between the commercial volume level and the program volume level is greater than the incremental volume level.

5. The device of claim 4, wherein the commercial volume level is N multiplied by the incremental volume level less than the program volume level, wherein N is in a range of approximately 3 to approximately 7.

6. A toggle volume method for use in conjunction with a multimedia content delivery service, the method comprising:
responding, by a set top box to an isolated toggle volume signal from a remote control device by toggling a volume setting between a program volume level and a commercial volume level wherein the commercial volume level and the program volume level are both audible volume levels; and
responding to a second toggle volume signal in close chronological proximity to a first toggle volume signal by muting a current volume when the current volume is not currently muted and by un-muting the current volume when the current volume is currently muted; and
altering a volume setting by an incremental volume in response to detecting a volume change signal from the remote control, wherein the commercial volume level is less than the program volume level by an amount approximately equal the product of N and the incremental volume, wherein N is in the range of approximately 3 to approximately 7.

7. The method of claim 6, further comprising storing user programmable values representing the commercial volume level and the program volume level.

8. The method of claim 6, further comprising storing a current volume level as the program volume level in response to a set-program-volume signal.

9. The method of claim 6, further comprising storing a current volume level as the commercial volume level in response to a set-commercial-volume signal.

* * * * *